US009585078B2

(12) United States Patent
Singh et al.

(10) Patent No.: US 9,585,078 B2
(45) Date of Patent: Feb. 28, 2017

(54) OFFLOADING TRAFFIC VIA A WIRELESS PEER-TO-PEER CONNECTION

(71) Applicant: Apple Inc., Cupertino, CA (US)

(72) Inventors: Ajoy K. Singh, Milpitas, CA (US); Syed A. Mujtaba, Santa Clara, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 14/158,237

(22) Filed: Jan. 17, 2014

(65) Prior Publication Data

US 2014/0204834 A1 Jul. 24, 2014

Related U.S. Application Data

(60) Provisional application No. 61/754,614, filed on Jan. 20, 2013.

(51) Int. Cl.
*H04W 88/04* (2009.01)
*H04B 7/155* (2006.01)
*H04W 40/22* (2009.01)

(52) U.S. Cl.
CPC .................... *H04W 40/22* (2013.01)

(58) Field of Classification Search
CPC ............. H04W 76/023; H04W 76/043; H04W 40/00–40/22
USPC .......................................... 370/315
See application file for complete search history.

(56) References Cited

U.S. PATENT DOCUMENTS

| 2011/0149816 A1 | 6/2011 | Saito et al. |
| 2011/0320588 A1 | 12/2011 | Raleigh |
| 2012/0057456 A1* | 3/2012 | Bogatin ............... H04W 28/08 370/230.1 |
| 2012/0208461 A1 | 8/2012 | Choi et al. |
| 2012/0281621 A1 | 11/2012 | Lotfallah et al. |

(Continued)

FOREIGN PATENT DOCUMENTS

| KR | 1020090030008 | 3/2009 |
| KR | 1020110106699 | 9/2011 |

OTHER PUBLICATIONS

PCT Application No. PCT/US2014/011978—International Search Report & Written Opinion dated Apr. 29, 2014.

(Continued)

*Primary Examiner* — Andrew Chriss
*Assistant Examiner* — Voster Preval
(74) *Attorney, Agent, or Firm* — Downey Brand LLP

(57) ABSTRACT

A method for offloading data traffic from a cellular connection to a WLAN connection via a wireless P2P connection is disclosed. The method can include the wireless communication device accessing offloading coordination information from an offload coordination service server, including information about at least one neighboring wireless communication device being within sufficient proximity of the wireless communication device to establish a wireless P2P connection and having access to a WLAN access point; using the offloading coordination information to select a relay device from the at least one neighboring wireless communication device; establishing a wireless P2P connection with the relay device; and offloading data traffic from the cellular connection to the wireless P2P connection so that the data traffic is relayed from the relay device to a network via a WLAN access point accessible to the relay device.

20 Claims, 9 Drawing Sheets

(56) References Cited

U.S. PATENT DOCUMENTS

| | | | | |
|---|---|---|---|---|
| 2013/0225174 A1* | 8/2013 | Hunukumbure | ...... | H04W 28/08 455/436 |
| 2014/0036793 A1* | 2/2014 | Johnsson | ................ | H04L 45/28 370/329 |
| 2014/0079218 A1* | 3/2014 | Cheng | ................... | H04W 12/02 380/270 |
| 2014/0105083 A1* | 4/2014 | Krishnaswamy | ..... | H04W 40/10 370/311 |

OTHER PUBLICATIONS

Taiwanese Patent Application No. 103101864—Office Action dated Jul. 24, 2015.

* cited by examiner

OFFLOADING TRAFFIC VIA A WIRELESS PEER-TO-PEER CONNECTION

CROSS-REFERENCE TO RELATED APPLICATIONS

This application claims the benefit of U.S. Provisional Application No. 61/754,614, filed Jan. 20, 2013 and entitled "OFFLOADING TRAFFIC VIA A WIRELESS PEER-TO-PEER CONNECTION," which is incorporated by reference herein in its entirety for all purposes.

FIELD OF THE DESCRIBED EMBODIMENTS

The described embodiments generally relate to wireless communication technology, and more particularly to offloading traffic by a wireless communication device from a cellular connection to a wireless peer-to-peer (P2P) connection.

BACKGROUND

Cellular networks are encountering exponential growth of Internet traffic, such as video traffic, web browsing traffic, and other data traffic that can be carried over the Internet. This exponential growth in Internet traffic has resulted in a rising cost of service delivery for cellular network operators, which, in some cases, has dampened profitability. As a result, many cellular network operators have at least begun to phase out unlimited data plans and to replace unlimited data plans with usage based billing plans, which can cap an amount of data traffic that can be used by a customer in a given billing period and/or charge per unit of data traffic used by a customer.

Given the increasing costs of data traffic communicated via cellular networks, wireless subscribers are often motivated to offload Internet traffic to lower cost networks, such as free wireless local area networks (WLANs), subscription based WLANs, and/or operator provided WLANs. In this regard, WLAN access is typically not predicated on usage based billing, so users can generally use WLANs without worrying about exceeding a data traffic cap.

Many wireless communication devices that are capable of operating on both cellular networks and WLANs are configured to aggressively offload Internet traffic to a WLAN, even when both WLAN radios and cellular radios are simultaneously active. However, a wireless communication device can only offload Internet traffic to a WLAN, if it has access to WLAN Internet service provided via the WLAN. Wireless communication devices frequently do not have appropriate credentials to access WLAN service at various hotspots, such as provided by hotels, on airplanes, in airports, and at restaurants, particularly when the user has not purchased WLAN service from the hotspot providers that offer the service for these hotspots or from associated roaming partners. This scenario in which a wireless communication device can be without credentials to access a WLAN can especially occur when users roam to foreign countries.

SUMMARY

The described embodiments generally relate to wireless communication technology, and more particularly to offloading traffic by a wireless communication device from a cellular connection to a wireless peer-to-peer (P2P) connection.

Methods and apparatuses to offload data traffic from a cellular connection with a network to a wireless local area network (WLAN) connection via a relay device are described herein. The methods and apparatuses provide for establishing a wireless peer-to-peer (P2P) connection between a wireless communication device and a neighboring wireless communication device over which to offload data traffic from the cellular connection. The wireless communication device can access offloading coordination information, e.g., from an offload coordination service server, for one or more neighboring devices that are within sufficient proximity of the wireless communication device to establish the wireless P2P connection and that have access to at least one wireless access point with which to connect to the network. The wireless communication device can be connected to the network via the cellular connection and can access the offloading coordination information from the offload coordination service server via the cellular connection. The wireless communication device can use the offloading coordination information to select a relay device from the one or more neighboring devices. The offloading coordination information can include a neighbor list of neighbor devices for the wireless communication device, a set of capabilities information for the one or more neighboring devices, a list of candidate relay devices, one or more security credentials with which to establish the wireless P2P connection, location information, traffic loading information, quality of service information, or other information useful for selecting a neighboring device as a relay device with which to establish the wireless P2P connection. The selected neighboring device can relay and/or route data traffic for the wireless communication device to the network, e.g., via wireless P2P connection and then via a WLAN connection with the wireless access point, which in turn can be connected to the network. The wireless communication device can be unable to access the wireless access point directly, e.g., not have security credentials required for access to the wireless access point, but can instead indirectly access the wireless access point via the relay device to offload all or a portion of data traffic communicated between the wireless communication device and the network. The wireless communication device and other wireless communication devices can register with the offload coordination service server to participate in an offloading coordination service. Registered wireless communication devices can provide capability information to the offload coordination service server, e.g., location information, or other information useful for determining selection of a wireless communication device to serve as a relay device. The wireless communication devices can update the capability information, e.g., as location of the wireless communication device and/or a set of neighboring devices near the wireless communication device changes.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Figure 1:
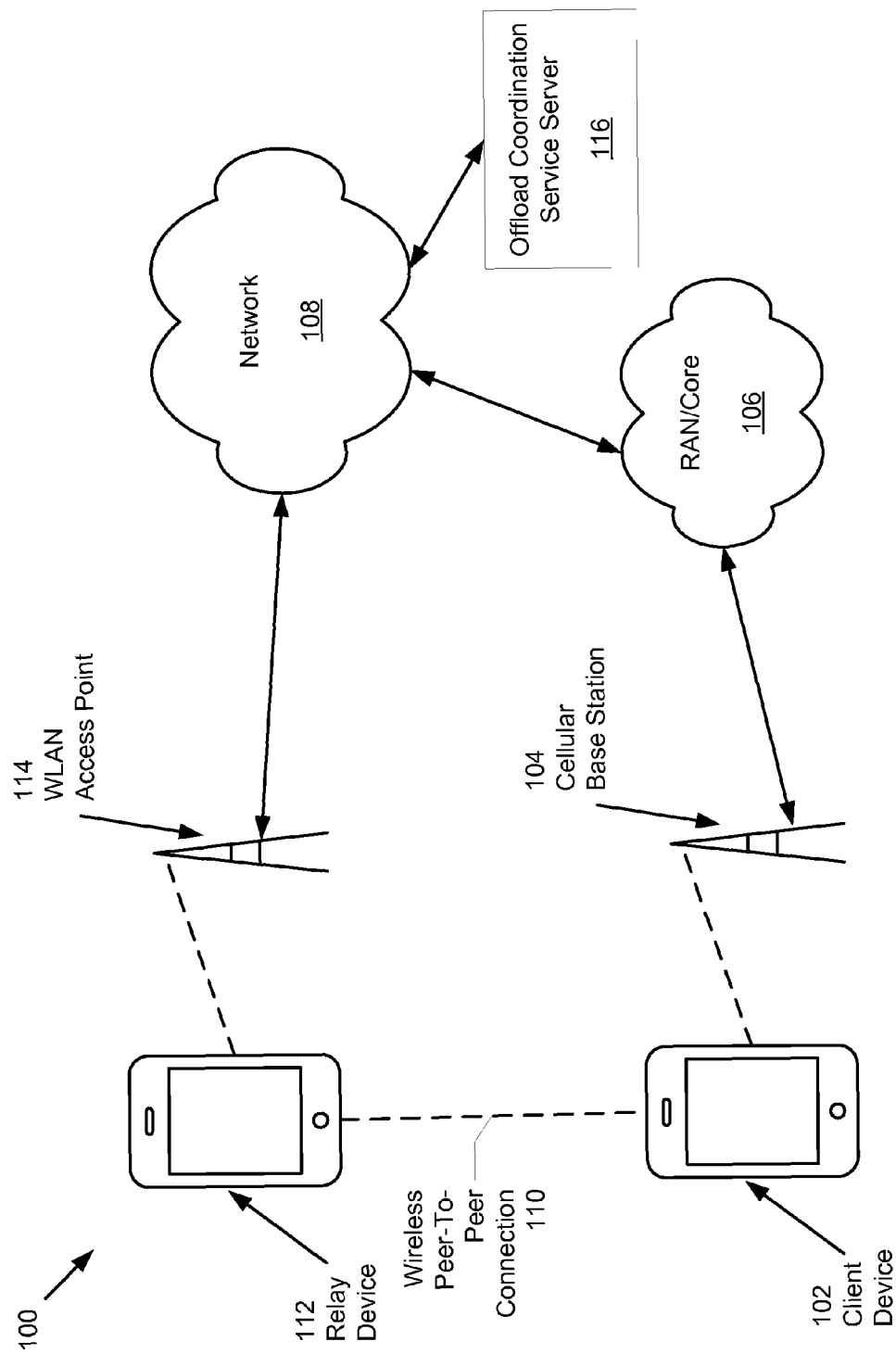
FIG. 1 illustrates a wireless communication system in accordance with some example embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments provide for offloading traffic, e.g., data traffic, via a wireless peer-to-peer (P2P) connection. In this regard, some example embodiments provide a wireless communication device that can establish a wireless P2P connection with a neighboring wireless communication device in accordance with a P2P WLAN technology, such as Wi-Fi direct, AWDL (Apple® Wireless Direct Link), or the like. In such embodiments, the neighboring wireless communication device can have access to a WLAN access point to which the wireless communication device does not have direct access. The neighboring wireless communication device can function as a relay device to provide indirect access to a network via the WLAN access point by relaying traffic between the wireless communication device and the network via the WLAN access point for the wireless communication device that does not have direct access to the network via the WLAN access point. As such, the wireless communication device, in accordance with some example embodiments, can offload some or all of its own traffic from a cellular network connection to a second wireless connection, even when the wireless communication device does not have direct access to the network via a WLAN access point by using a wireless P2P connection to a neighboring wireless communication device that acts as a relay device and does have access to the network via the WLAN access point.

Some example embodiments additionally provide an offload coordination service, e.g., using an offload coordination service server, which can facilitate offloading of traffic by a wireless communication device from a first wireless connection, e.g., a cellular network connection, to a second wireless connection, e.g., a wireless peer-to-peer connection. The offload coordination service server can provide a central registration point, as well as serve as a repository for offloading coordination information that can be used by the wireless communication device to establish a wireless P2P connection with a relay device to facilitate offloading traffic from the cellular network connection when the wireless communication device is not able to access a WLAN access point directly. In this regard, wireless communication devices can register to the offload coordination service, e.g., via the offload coordination service server, to participate in a service in which participating wireless communication devices can function as relay devices for offloading traffic on behalf of wireless communication devices that may not have access to a WLAN access point. The offload coordination service server of such embodiments can provide a secure mechanism to allow registered service users and/or devices to access a network through their wireless communication devices, as security credentials that may be needed to establish a wireless P2P connection between the wireless communication device that seeks to offload data traffic and the "relay" wireless communication device can be maintained by the offload coordination service server, which can provide access for registered users (and/or devices) of the service. The offload coordination service server can further provide an incentive for users of wireless communication devices to allow their wireless communication devices to serve as relay devices for other wireless communication devices that do not have access to a WLAN access point, as users of the wireless communication devices that offer relay capabilities can receive reciprocal privileges from other users/devices when, in turn, they do not have access to a WLAN access point. In some embodiments, the offload coordination server can include a "fairness" mechanism to ensure that users of wireless communication devices can offload a "fair" share of data to a WLAN access point. For example, when a first wireless communication device allows offloading of an amount of data for one or more other wireless communication devices, the first wireless communication device can be "credited" with an allocation of a comparable or proportional amount of data that the first wireless communication device can offload through other wireless communication devices. In some embodiments, when the first wireless communication device is unable to offload all or a portion of the "credited" allocation of a comparable or proportional amount of data through other wireless communication devices, the offload coordination service server can provide another form of compensation to a user of the wireless communication device, e.g., credits for a service to which the wireless communication device and/or the user subscribes. In some embodiments, the allocation of a comparable or proportional amount of data can be associated with a time period, and upon expiration of the time period, the comparable or proportional amount of data (or a remaining unused amount) can be converted to another form of compensation for the wireless communication device and/or the user thereof. The offload coordination service server can apply various forms of compensation to wireless communication devices and/or users thereof that offer offloading capabilities for other wireless communication devices to ensure "fairness" for providing the offloading capabilities. In some embodiments, the offload coordination service server can provide for credits and/or monetary compensation for a carrier based service to which the wireless communication device and/or a user thereof subscribe in exchange for offering offloading capabilities to other wireless communication devices. Different mechanisms to compensate "fairly" for providing offloading capabilities can be used in different deployment scenarios. In some embodiments, the offload coordination service server can prevent or disallow direct access (e.g., via a Wi-Fi access point) or indirect access (e.g., via another wireless communication device connected to a Wi-Fi access point) for wireless communication devices and/or users thereof to offloading data under certain circumstances. For example, the offload coordination service server can seek to ensure that wireless communication devices do not unreasonably affect available bandwidth, throughput rates, or availability of other shared resources of a service through which offloading takes place to other users and/or devices that share the service. The offload coordination service server can provide accounting mechanisms to determine resource usage by wireless communication devices and/or users through one or more different wireless service providers, including e.g., cellular service providers and/or Wi-Fi service providers. In some embodiments, the offload coordination service server can implement policies and/or compensation mechanisms to compensate wireless service providers that are used by wireless communication devices for offloading purposes, e.g., a highly used service of a service provider can be provided a form of compensation for the additional usage incurred by offloading. In this regard, the offload coordination service server can provide a platform by which various interested users can leverage each other's wireless communication devices and Internet services to support offloading of data traffic for mutual benefit.

FIG. 1 illustrates a wireless communication system 100 in accordance with some example embodiments. The wireless communication system 100 can include a client device 102. The client device 102 can be any wireless communication device that can be capable of communicating via both a cellular network technology and a WLAN technology. By way of non-limiting example, the client device 102 can be embodied as a cellular phone, such as a smart phone device, a tablet computing device, a laptop computing device, and/or other computing device that can be configured to communicate over both a cellular network connection and a WLAN connection.

The client device 102 can connect to a cellular network via a cellular base station 104. The cellular network can use any of a variety of cellular radio access technologies (RATs), including, by way of non-limiting example, a fourth generation (4G) RAT, such as a long term evolution (LTE) RAT (e.g., LTE, LTE-Advanced (LTE-A), or other LTE technology); a third generation (3G) RAT, such as a Wideband Code Division Multiple Access (WCDMA) RAT or a Universal Mobile Telecommunications System (UMTS) RAT; a second generation (2G) RAT, such as a Global System for Mobile Communications (GSM) RAT; and/or other cellular RAT that is in existence and/or that may be developed in the future. The cellular base station 104 can be any type of cellular base station, depending on a type of RAT that can be implemented on the cellular network. By way of non-limiting example, the cellular base station 104 can be an evolved node B (eNB), a node B, a base transceiver station (BTS), and/or another type of cellular access point or base station.

The cellular network can include a radio access network (RAN)/core network 106, which can be interfaced with a network 108. The network 108 can include one or more wireless networks, one or more wire-line networks, or some combination thereof, and in some example embodiments, can include the Internet. The client device 102 can use a cellular connection to communicate with another device (not shown) over the network 108. In this regard, data traffic can be communicated between the client device 102 and the network 108 via the cellular base station 104 and RAN/core network 106 through a cellular network connection.

The client device 102 can seek to offload data traffic that can be communicated over the network 108 from the cellular network connection to a separate WLAN connection. However, in some instances, the client device 102 may not have access privileges for a WLAN access point through which the separate WLAN connection can provide for communicating data traffic with the network 108. For example, the client device 102 may not have a security code or other credential that may be needed for accessing a WLAN access point that can be within a given proximity of the client device 102. The WLAN access point can be detectable by the client device 102 but can also be "locked" or otherwise require authentication to grant access to the client device 102 to form a WLAN connection with the WLAN access point. While the client device 102 may not be able to access the WLAN access point directly, in some circumstances, the client device 102 can be within a proximity of one or more neighboring wireless communication devices, such as the relay device 112, which may itself have access to a WLAN access point, such as the WLAN access point 114. In accordance with some example embodiments, the client device 102 can establish a wireless P2P connection 110 with a neighboring device, such as the relay device 112. The wireless P2P connection 110 can be established using any WLAN protocol or other networking protocol that provides for P2P connections between wireless communication devices, including, for example, Wi-Fi direct, AWDL, and/or the like. Data traffic that can be communicated to the network 108 over the cellular network, e.g., via a cellular network connection, can accordingly be offloaded from the cellular network connection to the wireless P2P connection 110. In this regard, the client device 102 can communicate data traffic to the relay device 112 via the wireless P2P connection 110, and the relay device 112 can relay the data traffic to the network 108 via the WLAN access point 114. In some embodiments, the relay device 112 can serve as a termination for the wireless P2P connection 110 and can route data traffic between the client device 102 and network 108 via the WLAN access point 114.

In some example embodiments, the system 100 can include an offload coordination service server 116. The offload coordination service server 116 can comprise one or more computing devices that can be configured to provide an offload coordination service in accordance with one or more example embodiments. By way of non-limiting example, the offload coordination service server 116 can comprise one or more servers; a cloud computing infrastructure; a plurality of computing devices that can host a distributed application, which can, for example, use a distributed hash table(s) (DHT)-based lookup functionality; some combination thereof, or the like. In some example embodiments, the offload coordination service server 116 can be maintained by a network operator, e.g., a cellular network operator. It will be appreciated, however, that any entity that can provide an offload coordination service in accordance with various example embodiments can operate the offload coordination service server 116.

In accordance with some example embodiments, wireless communication devices, such as the client device 102 and relay device 112, can register with the offload coordination service server 116 as "participants" in an offload coordination service in accordance with one or more example embodiments. In some embodiments, the offload coordination service server 116 can determine eligibility of the client device 102 and/or the relay device 112 before allowing registration of the client device 102 and/or the relay device 112 with the offload coordination service server 116. Devices can be allowed to register based on their capabilities to provide wireless access for offloading to other wireless communication devices. For example, devices can be required to verify that they have a capability to offload data through a wireless service provider that offers WLAN access to its subscribers. In some embodiments, only particular wireless service providers can be supported, and a device can be required to subscribe to one or more of a list of particular service providers for which offloading coordination can be performed in order to be able to register for the offloading service. A device can verify by providing to the offload coordination service server 116 information that indicates the device subscribes to one or more wireless services, e.g., Wi-Fi services, of one or more wireless service providers. The offload coordination service server 116 can accordingly maintain information, which can be referred to as offloading coordination information, about devices, e.g., client device 102 and relay device 112, and/or users thereof who have registered to participate in the offload coordination service. The offloading coordination information can, for example, include security information (e.g., security credentials) that may be needed to establish a wireless P2P connection between a wireless communication device, e.g., client device 102, and a neighboring wireless communication device, e.g., relay device 112, so that the neighboring wireless communication device can provide a relay function, e.g., as provided by the relay device 112, to facilitate offloading data traffic from a cellular connection for the wireless communication device that does not have access to a WLAN access point to which the neighboring wireless communication device can access. In some embodiments, the offload coordination service server 116 can maintain accounting information, e.g., data offloaded by a particular client device 102 and/or data relayed by a particular relay device 112. The offload coordination service server 116 can use the accounting information, in some embodiments, to implement service access control for various devices and/or to provide a fairness mechanism for access to and/or use of wireless services provided for offloading among a set of devices.

A wireless communication device, such as the client device 102 and/or relay device 112, participating in the offload coordination service can communicate with the offload coordination service server 116 via any wireless or wire-line network connection that can provide access to the network 108, including, by way of non-limiting example, a cellular connection and a WLAN connection. Thus, for example, when a WLAN connection is not available to a wireless communication device, the wireless communication device can use a cellular connection to communicate with the offload coordination service server 116 in accordance with some example embodiments. As such, a wireless communication device participating in the offload coordination service, e.g., having registered with the offload coordination service server 116 previously, can use any available network connection to update offloading coordination information to the offload coordination service server 116, to access offloading coordination information from the offload coordination service server 116, and/or to communicate with the offload coordination service server 116 for other purposes in accordance with various example embodiments.

Offloading coordination information that can be maintained by the offload coordination service server 116 can additionally or alternatively include neighbor lists of neighboring wireless communication devices for wireless communication devices participating in the offload coordination service. For example, in some example embodiments, wireless communication devices participating in the offload coordination service can provide lists of their neighboring wireless communication devices to the offload coordination service server 116. In this regard, in some example embodiments, participating wireless communication devices can sense neighboring wireless communication devices (e.g., wireless communication devices that can be within sufficient proximity to establish a wireless P2P connection) and can inform the offload coordination service server 116 of the sensed neighboring wireless communication devices. In such embodiments, a participating wireless communication device can update its neighbor list with the offload coordination service server 116, such as periodically, in response to a change in location, in response to detection of a new neighboring wireless communication device, in response to no longer detecting a previous neighboring wireless communication device, and/or in response to other conditions for which a neighbor list can be updated. In some embodiments, the wireless communication device detects the presence of a new neighboring wireless communication device and/or detects the absence of a previously detected neighboring wireless communication device and provides an update of the capabilities information provided to the offload coordination service server 116 in response to such detection. The offload coordination service server 116 can accordingly maintain neighbor lists that can be furnished by participating wireless communication devices in some example embodiments.

Additionally or alternatively, in some example embodiments, the offload coordination service server 116 can be configured to build neighbor lists for participating wireless communication devices based on location information for the participating wireless communication devices. In this regard, a participating wireless communication device in accordance with such example embodiments can provide location information for itself to the offload coordination service server 116. The reported location information can, for example, be determined through Global Positioning Service (GPS) tracking and/or another technology that can be used to determine the location information for a wireless communication device. The offload coordination service server 116 of some example embodiments can accordingly use reported location information to build neighbor lists for participating wireless communication devices. In this regard, participating wireless communication devices that have sufficiently proximate locations to each other, e.g., as provided by location information to the offload coordination service server 116, can be considered neighbors.

In some example embodiments, offloading coordination information that can be maintained by the offload coordination service server can include capabilities information for participating devices. Capabilities information can, for example, include one or more WLAN technologies, such as one or more versions of one or more Institute of Electrical and Electronics Engineers (IEEE) 802.11 wireless communication protocols, that can be supported by a participating wireless communication device; an actual or estimated WLAN data rate available to a participating wireless communication device; a quality of service (QoS) that can be offered by a WLAN connection available to a participating wireless communication device; an actual or estimated amount of remaining battery life for a participating wireless communication device; hardware capabilities of a participating wireless communication device; and/or other capabilities of a participating wireless communication device. The capabilities information of one or more participating wireless communication devices can be updated, e.g., periodically and/or a-periodically, by the participating wireless communication devices providing update information to the offload coordination service server 116.

The client device 102 of some example embodiments can be configured to access offloading coordination information from the offload coordination service server 116 via the cellular connection (or via another network connection) when initiating an offload request. The client device 102 can use the offloading coordination information to select a neighboring wireless communication device to serve as a relay device and to establish a wireless connection with the selected neighboring wireless communication device through which to relay and offload data traffic for the client device 102. For example, in some embodiments, when a neighboring wireless communication device, such as the relay device 112, is not known to the client device 102, the client device 102 can use offloading coordination information provided by the offload coordination service server 116 to discover neighboring devices. As another example, in some embodiments, the offloading coordination information can include a security credential that can be used to establish a wireless P2P connection, such as the wireless P2P connection 110, between the client device 102 and a neighboring wireless communication device, e.g., the relay device 112. As a further example, the offloading coordination information can include capabilities information for one or more neighboring wireless communication devices that can be used by the client device 102 to select a neighboring wireless communication device to provide relay function, e.g., the relay device 112. In this regard, a neighboring wireless communication device having capabilities that satisfy a set of criteria, such as the neighboring wireless communication device having a "best" and/or "matching" set of capabilities, the neighboring wireless communication device satisfying a minimum threshold capability set, and/or another set of criteria that can be used to select a neighboring wireless communication device in an instance in which multiple neighboring wireless communication devices may be available for use as relay devices for the client device 102.

In some example embodiments, the offload coordination service server 116 and/or the client device 102 can be configured to select a neighboring wireless communication device to serve as a relay device based on a load-balancing scheme. For example, when a neighboring wireless communication device is available to the client device 102 and is not already serving as a relay device for another wireless communication device, that neighboring wireless communication device can be preferred for selection as a relay device for the client device 102 over another available neighboring wireless communication device that is serving as a relay device for a separate client device.

In some example embodiments, the client device 102 can decide when to initiate a request to establish a wireless P2P connection over which to offload all or a portion of data traffic, presently being communicated by a cellular connection with a network. The client device 102 can interact with the offload coordination service server 116 to acquire necessary capabilities, e.g., security credentials, to support establishing the wireless P2P connection with a neighboring device. In some embodiments, the client device 102 communicates with the offload coordination service server 116 using the cellular connection over which data traffic is presently being communicated with the network.

In some example embodiments, the relay device 112 routes data traffic provided by the client device 102 to the WLAN access point 114 to forward to the network 108. In some embodiments, the WLAN access point 114 is able to route the data traffic to the network 108, which in some embodiments comprises a portion of the Internet. In some example embodiments, the relay device 112 associates with the WLAN access point 114 in advance of receiving a request from the client device 102 to establish the wireless P2P connection. In some embodiments, the offloading coordination information includes an indication of an association between the WLAN access point 114 and the relay device 112. In some embodiments, the relay device 112 associates with the WLAN access point 114 in response to a request from the client device 102 to establish the wireless P2P connection. In some embodiments, the offloading coordination information includes an indication of a possible association between the WLAN access point 114 and the relay device 112. In some example embodiments, the relay device 112 terminates the wireless P2P connection initiated by the client device 102.

In some example embodiments, the offload coordination service server 116 maintains information by which a list of neighboring devices for a wireless communication device, e.g., the client device 102, can be determined. The information can include GPS location tracking information for the client device 102 and/or for devices within a predetermined range of the client device 102. In some examples embodiments, each wireless communication device, e.g., the client device 102 and/or the relay device 112, scan for neighboring wireless communication devices and upload information (e.g., a neighbor list, and/or information by which a neighbor list can be determined) to the offload coordination service server 116.

Figure 2:
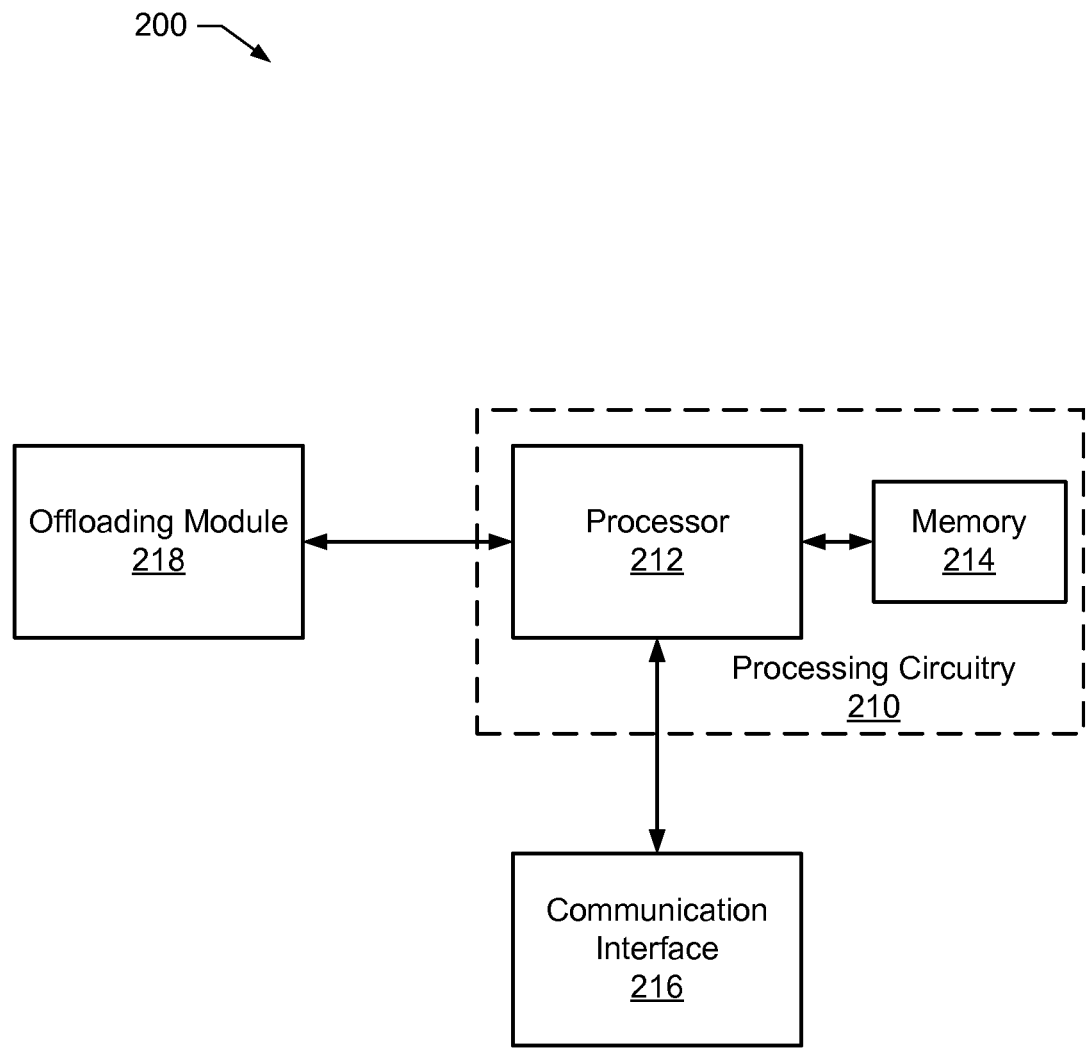
FIG. 2 illustrates a block diagram of an apparatus that can be implemented on a wireless communication device in accordance with some example embodiments.

FIG. 2 illustrates a block diagram of an apparatus 200 that can be implemented on a wireless communication device, such as the client device 102 and/or the relay device 112, which can participate in an offload coordination service in accordance with some example embodiments. In this regard, when implemented on a wireless communication device, such as the client device 102 and/or the relay device 112, apparatus 200 can enable the wireless communication device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset comprising one or more chips. In some example embodiments in which one or more components of the apparatus 200 are embodied as a chipset, the chipset can be capable of enabling a wireless communication device to operate in the system 100 when implemented on or otherwise operably coupled to the wireless communication device.

In some example embodiments, the processing circuitry 210 can include a processor 212 and, in some embodiments, such as that illustrated in FIG. 2, can further include memory 214. The processing circuitry 210 can be in communication with or otherwise control a communication interface 216 and/or offloading module 218.

The processor 212 can be embodied in a variety of forms. For example, the processor 212 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, communication interface 216, or offloading module 218 via one or more busses for passing information among components of the apparatus 200.

The apparatus 200 can further include communication interface 216. The communication interface 216 can include one or more interface mechanisms for enabling communication with other devices and/or networks, e.g., other wireless communication devices and/or networks via wireless connections. For example, the communication interface 216 can include a transceiver, an antenna (or multiple antennas) and supporting hardware and/or software configured to enable the apparatus 200 to connect to a cellular network, such as via cellular base station 104. As another example, the communication interface 216 can include a transceiver, an antenna (or multiple antennas) and supporting hardware and/or software configured to support connections via one or more WLAN technologies. As such, the communication interface 216 of some example embodiments can support a connection to a WLAN access point, such as the WLAN access point 114, and/or a wireless P2P connection, such as the wireless P2P connection 110.

The apparatus 200 can further include offloading module 218. The offloading module 218 can be embodied as various means, such as circuitry, hardware, a computer program product comprising computer readable program instructions stored on a non-transitory computer readable medium (for example, the memory 214) and executed by a processing device (for example, the processor 212), or some combination thereof. In some embodiments, the processor 212 (or the processing circuitry 210) can include, or otherwise control the offloading module 218.

The offloading module 218 can be configured to support interfacing with the offload coordination service server 116. In this regard, the offloading module 218 can be configured in some example embodiments to access offloading coordination information from the offload coordination service server 116, provide a neighbor list to the offload coordination service server 116, provide updated capabilities information to the offload coordination service server 116, and/or the like. The offloading module 218 of a wireless communication device, such as the client device 102, which seeks to offload data from a cellular connection to another connection, e.g., a WLAN connection, can be configured to select a neighboring wireless communication device, such as the relay device 112, to serve as a relay device and to initiate offloading via a wireless P2P connection, such as wireless P2P connection 110, which can be established between the wireless communication device and the selected neighboring device. The offloading module 218 of a wireless communication device, such as the relay device 112, when serving as an offloading relay for a client device, such as the client device 102 can be configured to route data between the client device and the network 108.

Figure 3:
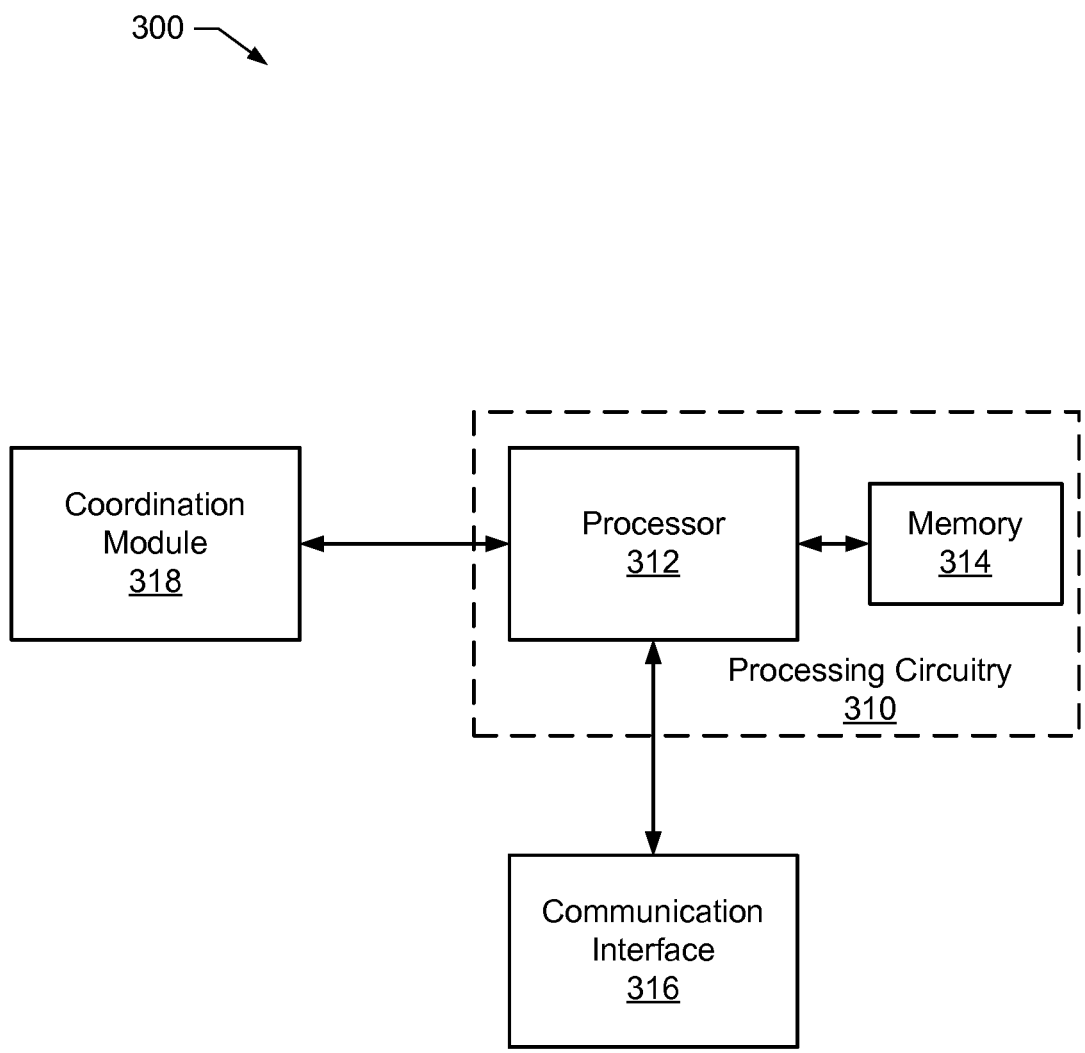
FIG. 3 illustrates a block diagram of an apparatus that can be implemented on an offload coordination service server in accordance with some example embodiments.

FIG. 3 illustrates a block diagram of an apparatus 300 that can be implemented on the offload coordination service server 116 in accordance with some example embodiments. It will be appreciated that the components, devices or elements illustrated in and described with respect to FIG. 3 may not be mandatory and thus some may be omitted in certain embodiments. Additionally, some embodiments can include further or different components, devices or elements beyond those illustrated in and described with respect to FIG. 3. Further, it will be appreciated that, in some example embodiments, one or more components of the apparatus 300 can be distributed across a plurality of computing devices that can collectively provide the functionality of the offload coordination service server 116.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset comprising one or more chips. In some example embodiments in which one or more components of the apparatus 300 are embodied as a chipset, the chipset can be capable of enabling a computing device(s) to operate as an offload coordination service server 116 when implemented on or otherwise operably coupled to the computing device(s).

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or coordination module 318.

The processor 312 can be embodied in a variety of forms. For example, the processor 312 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In embodiments including a plurality of processors, the plurality of processors can be implemented on a single computing device, or can be distributed across a plurality of computing devices that can collectively form the offload coordination service server 116. In some example embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In embodiments including a plurality of memory devices, the plurality of memory devices can be implemented on a single computing device, or can be distributed across a plurality of computing devices that can collectively form the offload coordination service server 116. In some embodiments, the memory 314 can be in communication with one or more of the processor 312, communication interface 316, or coordination module 318 via one or more busses for passing information among components of the apparatus 300.

The apparatus 300 can further include communication interface 316. The communication interface 316 can include one or more interface mechanisms for enabling communication with other devices and/or networks. For example, the communication interface 316 can be configured to enable the apparatus 300 to communicate over the network 108. In various example embodiments, the communication interface 316 can include, for example, an antenna (or multiple antennas) and supporting hardware and/or software for enabling communications with one or more wireless communication networks, such as a cellular network, and/or a communication modem or other hardware/software for supporting communication via cable, digital subscriber line (DSL), USB, FireWire, Ethernet or other wire-line networking methods.

The apparatus 300 can further include coordination module 318. The coordination module 318 can be embodied as various means, such as circuitry, hardware, a computer program product comprising computer readable program instructions stored on a non-transitory computer readable medium (for example, the memory 314) and executed by a processing device (for example, the processor 312), or some combination thereof. In some embodiments, the processor 312 (or the processing circuitry 310) can include, or otherwise control the coordination module 318. The coordination module 318 can be configured to support registration of wireless communication devices and/or users thereof for the offload coordination service, maintenance of offloading coordination information for participating wireless communication devices, provisioning of offloading coordination information to a wireless communication device seeking to initiate offloading, and/or other functions that can be performed by the offload coordination service server 116 in support of the offload coordination service of one or more example embodiments.

Figure 4:
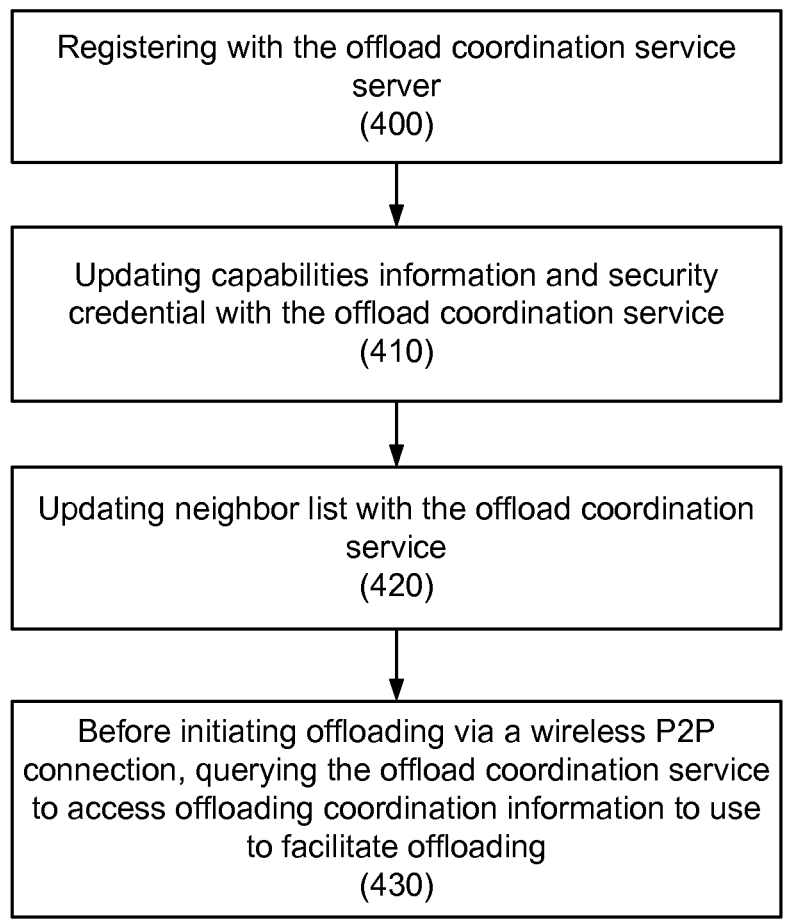
FIG. 4 illustrates a flow chart of an example method for using an offload coordination service to facilitate offloading of traffic by a wireless communication device in accordance with some example embodiments.

FIG. 4 illustrates a flow chart of an example method for using an offload coordination service, e.g., as can be provided in conjunction with the offload coordination service server 116, to facilitate offloading of traffic between wireless communication devices in accordance with some example embodiments. In this regard, FIG. 4 illustrates operations that can be performed by a wireless communication device, such as the client device 102 and/or relay device 112, which can participate in the offload coordination service of one or more example embodiments. One or more of processing circuitry 210, processor 212, memory 214, communication interface 216, or offloading module 218 can, for example, provide means for performing the operations illustrated in and described with respect to FIG. 4. Operation 400 can include a wireless communication device (e.g., by a user thereof) registering the wireless communication device (and/or the user) to use the offload coordination service. For example, registration can be made to the offload coordination service server 116. Operation 410 can include the wireless communication device updating capabilities information and/or a security credential with the offload coordination service, e.g., to the offload coordination service server 116. Operation 410 can be performed at regular or irregular time intervals, e.g., periodically and/or a-periodically, by the wireless communication device to update information provided to the offload coordination service server 116 that can be used to facilitate offloading in accordance with one or more example embodiments. In this regard, at least some capabilities information of wireless communication device (e.g., registered with the offload coordination service server 116 to use and/or provide capabilities for the offload coordination service) can be dynamic, and thus the capabilities information maintained for the offload coordination service, e.g., at the offload coordination service server 116, can be updated as capabilities of wireless communication devices change. Operation 420 can include the wireless communication device updating its neighbor list with the offload coordination service, e.g., providing incremental, new, or otherwise update information for its own neighbor list to the offload coordination service server 116. Operation 420 can, for example, be performed at regular or irregular time intervals, periodically, a-periodically, in response to a change in location of the wireless communication device, in response to a change in the constituency of neighboring wireless communication devices within proximity of the wireless communication device, and/or the like. In some example embodiments, a location of the wireless communication device can be provided to the offload coordination service server 116 in addition to, or in lieu of, performance of operation 420 to enable the offload coordination service server 116 to build a neighbor list for the wireless communication device. In some embodiments, the wireless communication device builds and/or maintains an updated neighbor list and provides the neighbor list and/or updates for the neighbor list to the offload coordination service server 116. In some embodiments, the offload coordination service server 116 builds and/or maintains a neighbor list for a wireless communication device and provides the neighbor list to one or more wireless communication devices. Operation 430 can include the wireless communication device querying the offload coordination service server 116 to access offloading coordination information to use to facilitate offloading before initiating offloading traffic from a cellular connection to a wireless P2P connection. The offloading coordination information accessed by the wireless communication device can include a neighbor list for the wireless communication device, capabilities information for one or more neighboring wireless communication devices, a set of security credentials for one or more neighboring wireless communication devices, and/or the like. The offloading coordination information accessed by the wireless communication device can accordingly be used to select a neighboring wireless communication device to serve as a relay device, to facilitate accessing a selected neighboring wireless communication device, and/or the like. In some embodiments, the wireless communication device selects an appropriate neighboring wireless communication device to act as a relay device, e.g., based on information provided by the offload coordination service server 116. In some embodiments, the offload coordination service server 116 selects an appropriate neighboring wireless communication device to act as a relay device for a wireless communication device, e.g., based on selection criteria provided by the wireless communication device and/or based on information stored and maintained by the offload coordination service server 116. In some embodiments, the offload coordination service server 116 provides a set of candidate relay devices selected from a neighbor list for the wireless communication device to the wireless communication device. In some embodiments, the wireless communication device selects a particular wireless communication device in the set of candidate relay devices to serve as a relay device for offloading data traffic from the wireless communication device. In some embodiments, the wireless communication device queries the offload coordination service server 116 and/or one or more neighboring wireless communication devices in order to establish a wireless peer-to-peer connection with a neighboring wireless communication device over which to offload data traffic for the wireless communication device. In some embodiments, the wireless communication device obtains a security credential for a neighboring wireless communication device from the offload coordination service server, e.g., as part of the offloading coordination information, and provides the security credential to the neighboring wireless communication device when seeking to establish a peer-to-peer wireless communication with the neighboring wireless communication device through which to offload data traffic from a cellular connection. In some embodiments, the security credential is provided when querying the neighboring wireless communication device to establish the peer-to-peer connection.

Figure 5:
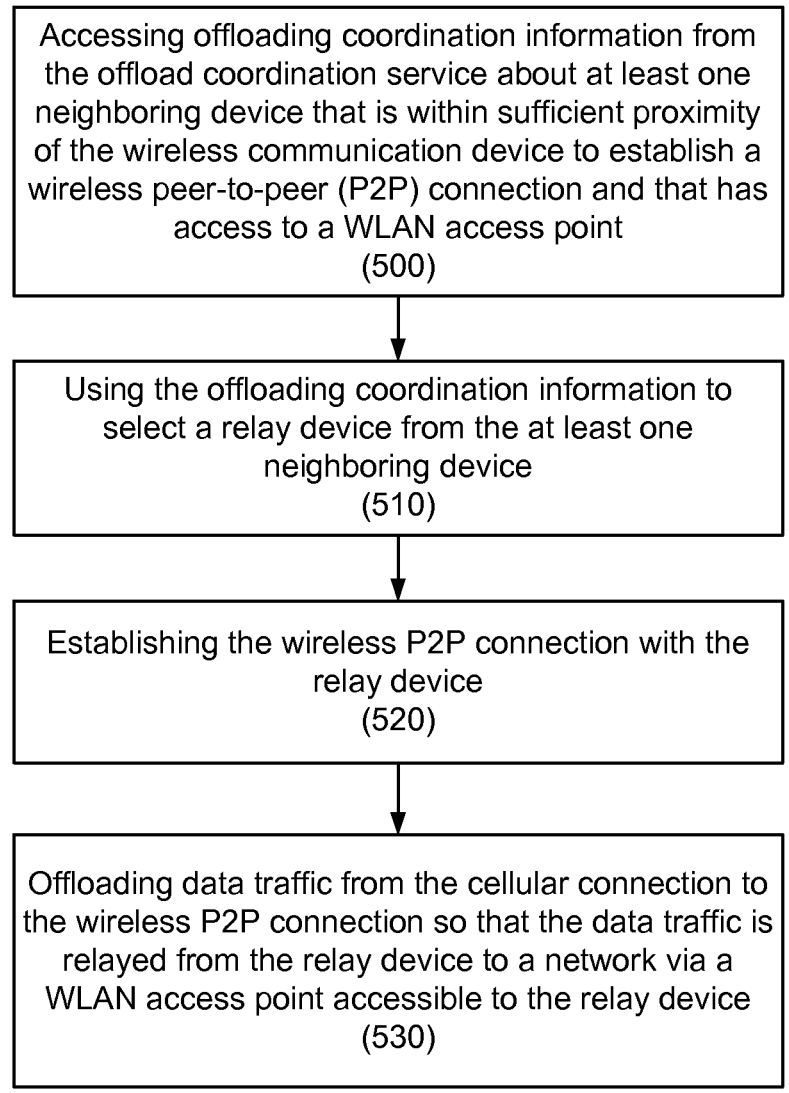
FIG. 5 illustrates a flow chart of another example method for using an offload coordination service to facilitate offloading of traffic by a wireless communication device in accordance with some example embodiments.

FIG. 5 illustrates a flow chart of another example method for using an offload coordination service to facilitate offloading in accordance with some example embodiments. In this regard, FIG. 5 illustrates operations that can be performed by a wireless communication device, such as the client device 102, seeking to offload traffic from a cellular connection in accordance with some example embodiments. One or more of processing circuitry 210, processor 212, memory 214, communication interface 216, or offloading module 218 can, for example, provide means for performing the operations illustrated in and described with respect to FIG. 5. Operation 500 can include a wireless communication device accessing offloading coordination information from the offload coordination service (e.g., from the offload coordination service server 116) about at least one neighboring wireless communication device being within sufficient proximity of the wireless communication device to establish a wireless peer-to-peer connection and having access to a WLAN access point. The offloading coordination information can, for example, include a neighbor list for the wireless communication device, capabilities information for one or more neighboring wireless communication devices, a set of security credentials for one or more neighboring wireless communication devices, and/or the like. Operation 510 can include the wireless communication device using the offloading coordination information to select a neighboring wireless communication device to function as a relay device, such as the relay device 112. In some embodiments, the wireless communication device selects the neighboring wireless communication device from the neighbor list for the wireless communication device. In some example embodiments, the offloading coordination information can include an indication of a neighboring wireless communication device selected by, or at least indicated as a preferred choice by the offload coordination service server 116. As such, in such example embodiments, a wireless communication device can select a relay device based on a preference or selection that can be made at least in part by the offload coordination service server 116, such as based on capabilities information, load balancing decisions, and/or the like. Operation 520 can include the wireless communication device establishing a wireless P2P connection with the relay device. In some embodiments, the wireless communication device sends a query to the selected relay device, the query including, in some embodiments, a security credential with which to establish the wireless P2P connection with the relay device. The security credential can be stored in the wireless communication device and/or can be obtained from the offload coordination service server 116, e.g., in the offloading coordination information. Operation 530 can include the wireless communication device offloading data traffic from the cellular connection to the wireless P2P connection so that the data traffic is relayed from the relay device to a network, such as network 108, via a WLAN access point, such as WLAN access point 114, accessible to the relay device. In some embodiments, the WLAN access point, e.g., WLAN access point 114, can be unavailable for direct connection by the wireless communication device but can be available indirectly via the relay device, e.g., based on establishing the wireless P2P connection to carry the offloaded data traffic of the wireless communication device. In some embodiments, the wireless communication device attempts to access the WLAN access point 114 and in response to determining that the wireless communication device is unable to access the WLAN access point, the wireless communication device accesses the offload coordination service server 116 to locate a relay device through which to connect to the WLAN access point 114.

Figure 6:
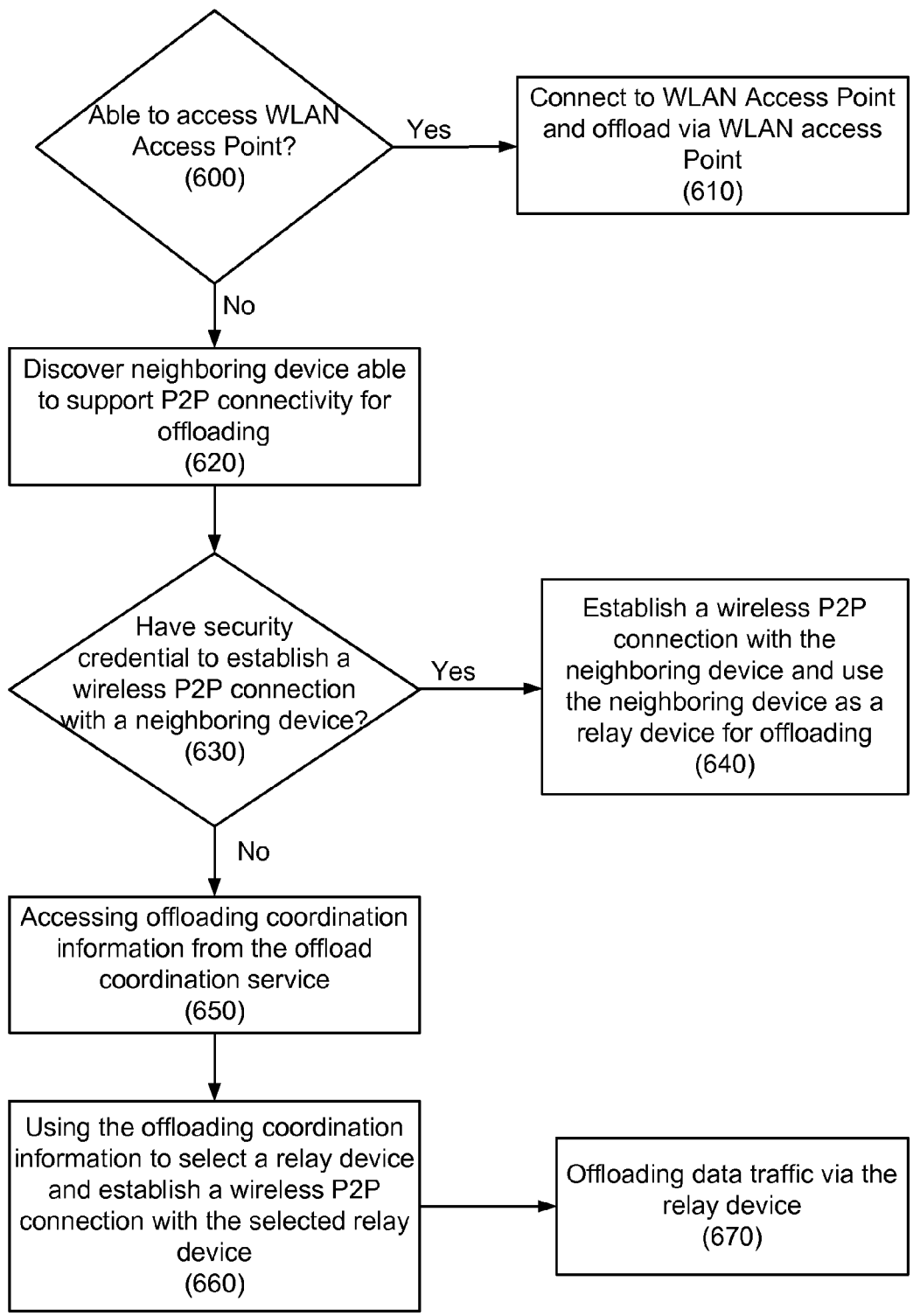
FIG. 6 illustrates a flow chart of a further example method for using an offload coordination service by a wireless communication device to facilitate offloading of traffic in accordance with some example embodiments.

FIG. 6 illustrates a flow chart of a further example method for using an offload coordination service to facilitate offloading of traffic in accordance with some example embodiments. In this regard, FIG. 6 illustrates operations that can be performed by a wireless communication device, such as the client device 102, seeking to offload traffic from a cellular connection to another connection, e.g., a WLAN connection, in accordance with some example embodiments. One or more of processing circuitry 210, processor 212, memory 214, communication interface 216, or offloading module 218 can, for example, provide means for performing the operations illustrated in and described with respect to FIG. 6. Operation 600 can include a wireless communication device determining whether it is able to access a WLAN access point. For example, operation 600 can include the wireless communication device determining whether there is a WLAN access point within range, whether the wireless communication device has appropriate security credentials and/or a subscription for accessing a WLAN access point that is within range, and/or the like. In some embodiments, the wireless communication device attempts to access the WLAN access point in order to determine whether access via the WLAN access point by the wireless communication device is possible. When it is determined at operation 600 that the wireless communication device is able to access a WLAN access point, the method can proceed to operation 610, which can include connecting to a WLAN access point (if not already connected) and offloading traffic via the WLAN access point.

When, however, it is determined at operation 600 that the wireless communication device is not able to access a WLAN access point, the method can proceed to operation 620 in lieu of operation 610. Operation 620 can include the wireless communication device discovering one or more neighboring wireless communication devices able to support P2P connectivity for offloading traffic. Operation 630 can include the wireless communication device determining whether it has a security credential (if needed) to establish a wireless P2P connection with a neighboring wireless communication device discovered in operation 620. If the wireless communication device does have the security credential, or if a security credential is not needed, the method can proceed to operation 640, which can include the wireless communication device establishing a wireless P2P connection with the neighboring wireless communication device and using the neighboring wireless communication device as a relay device for offloading traffic.

When, however, it is determined at operation 630 that the wireless communication device does not have a security credential that can be needed, the method can proceed to operation 650 in lieu of operation 640. Operation 650 can include the wireless communication device accessing offloading coordination information for one or more neighboring devices from the offload coordination service (e.g., from the offload coordination service server 116). The offloading coordination information can, for example, include one or more security credentials for one or more neighboring wireless communication devices, capabilities information for one or more neighboring wireless communication devices, and/or other information that can be used to select and use a neighboring wireless communication device as a relay device in accordance with various example embodiments. Operation 660 can include the wireless communication device using the offloading coordination information to select a relay device from among a set of discovered neighboring wireless communication devices and to establish a wireless P2P connection with the selected relay device. Operation 670 can include the wireless communication device initiating an offloading session via the wireless P2P connection and offloading data traffic via the relay device.

Some example embodiments also cover mobility scenarios in which a data connection of a wireless communication device, such as the client device 102, that is offloading traffic via a wireless peer-to-peer (P2P) connection can be handed over from one connection to another connection in response to device mobility. It will be appreciated that various embodiments provide for handover between various types of connections. For example, some embodiments facilitate handover between a P2P connection with a relay device, such as the relay device 112, and a WLAN connection with a WLAN access point. Such a handover can, for example, be performed in response to the client device 102 coming within range of a WLAN access point for which the client device 102 can have access privileges. As another example, some embodiments facilitate handover between a wireless P2P connection with a first relay device and a wireless P2P connection with a second relay device. Such a handover can, for example, be performed in response to degradation of a connection quality, such as can be quantified in terms of a received signal strength indicator (RSSI), measured signal to noise ratio (SNR), and/or other physical layer metrics, of the wireless P2P connection between the wireless communication device and the first relay device. As still a further example, some example embodiments facilitate handover between a wireless P2P connection with a relay device and a cellular connection to a cellular network.

In some example embodiments, wireless communication devices, such as the client device 102, and the offload coordination service server 116 can interwork with each other to support a mobility scenario to enable P2P-based offloading. In some example embodiments, the offload coordination service server 116 can be configured to assist in a handover scenario by providing capability information that can be associated with handover candidates. The client device 102 can utilize the capability information to decide an appropriate handover candidate. A mobility and multi-homing protocol (e.g., as provided by "Mobike") can be used to facilitate a layer 3 (L3) mobility solution, in accordance with some example embodiments. It will be appreciated, however, that where Mobike is described as a mobility solution in the description and following examples, Mobike is described by way of example, and not by way of limitation. In this regard, any L3 mobility protocol, such as Mobile Internet Protocol, GTP (general packet radio service tunneling protocol), PMIP (Proxy Mobile Internet Protocol version 6), and/or the like can be used to support L3 mobility, and can be substituted for Mobike in accordance with various example embodiments. By way of further non-limiting example, any mobility protocol set forth in Third Generation Partnership Project (3GPP) specifications TS 23.401, TS 23.402, and/or TS 23.234; Internet Engineering Task Force (IETF) specifications RFC 4555, RFC 6275, and/or RFC 5213; and/or other applicable specifications can be used to support L3 mobility in various example embodiments. A packet data gateway, such as an evolved packet data gateway (ePDG), and/or a packet data network gateway (PGW) can be used as an anchor point for layer 3 mobility in some example embodiments.

Figure 7:
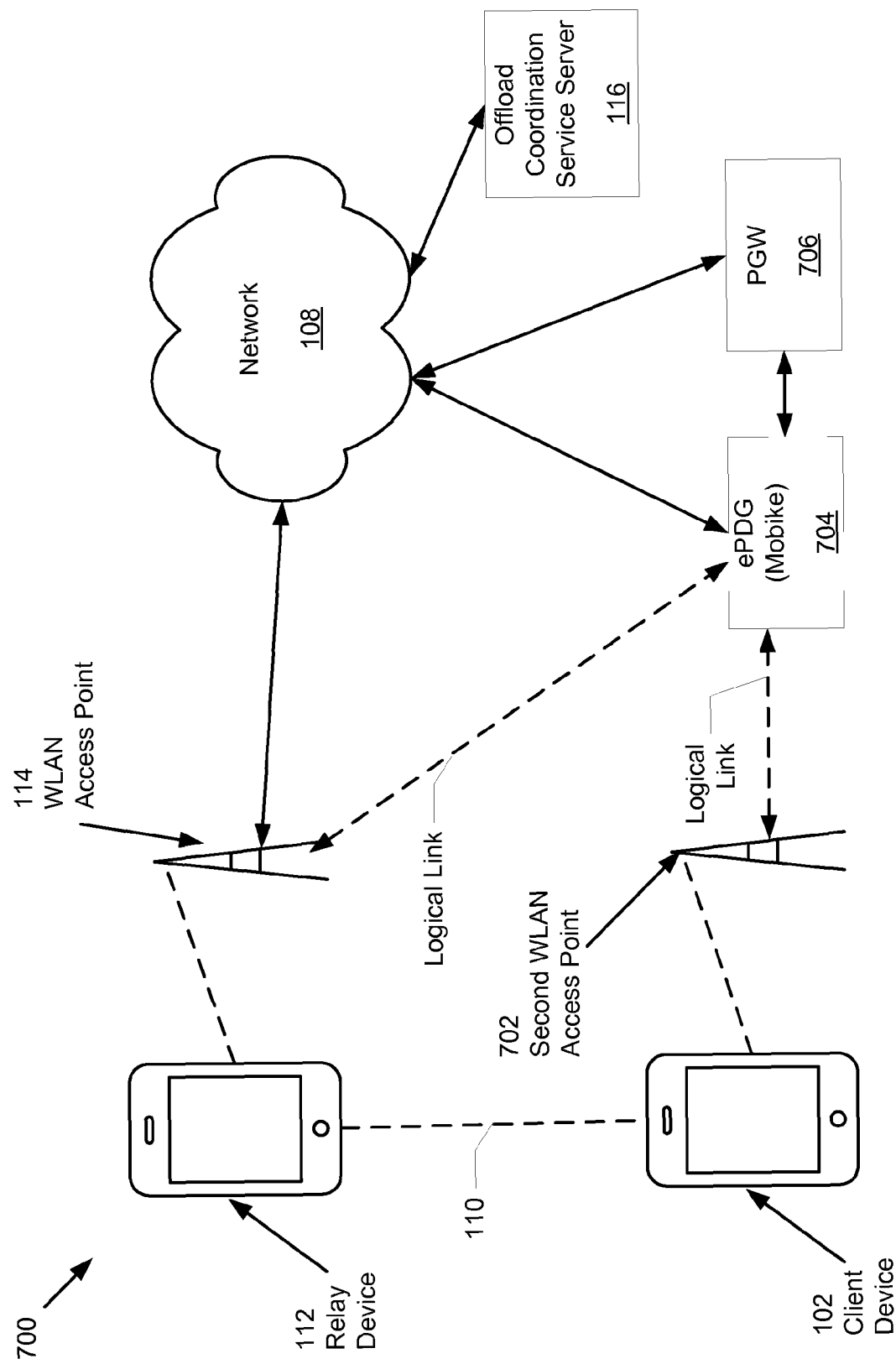
FIG. 7 illustrates an example system for facilitating handover of a wireless communication device between a wireless P2P connection with a relay device and a WLAN access point in accordance with some example embodiments.

FIG. 7 illustrates an example system 700 for facilitating handover between a wireless P2P connection 110 with a relay device 112, which communicates with a network 108 via a WLAN access point 114, and a WLAN connection through a second WLAN access point 702 in accordance with some example embodiments. An ePDG 704 and/or PGW 706 can be used to serve as mobility anchors and to ensure that a common network address, such as an Internet protocol (IP) address, is assigned to the client device 102 when the client device 102 moves from the wireless P2P connection 110 to a WLAN connection via the WLAN access point 702, or vice versa. In some embodiments, Mobike can be used to facilitate L3 mobility. In some embodiments, the ePDG 704 can be used as a mobility anchor for a handover between two different Wi-Fi connections, while the PGW 706 can be used as a mobility anchor for a handover between a Wi-Fi connection and a cellular connection.

Figure 8:
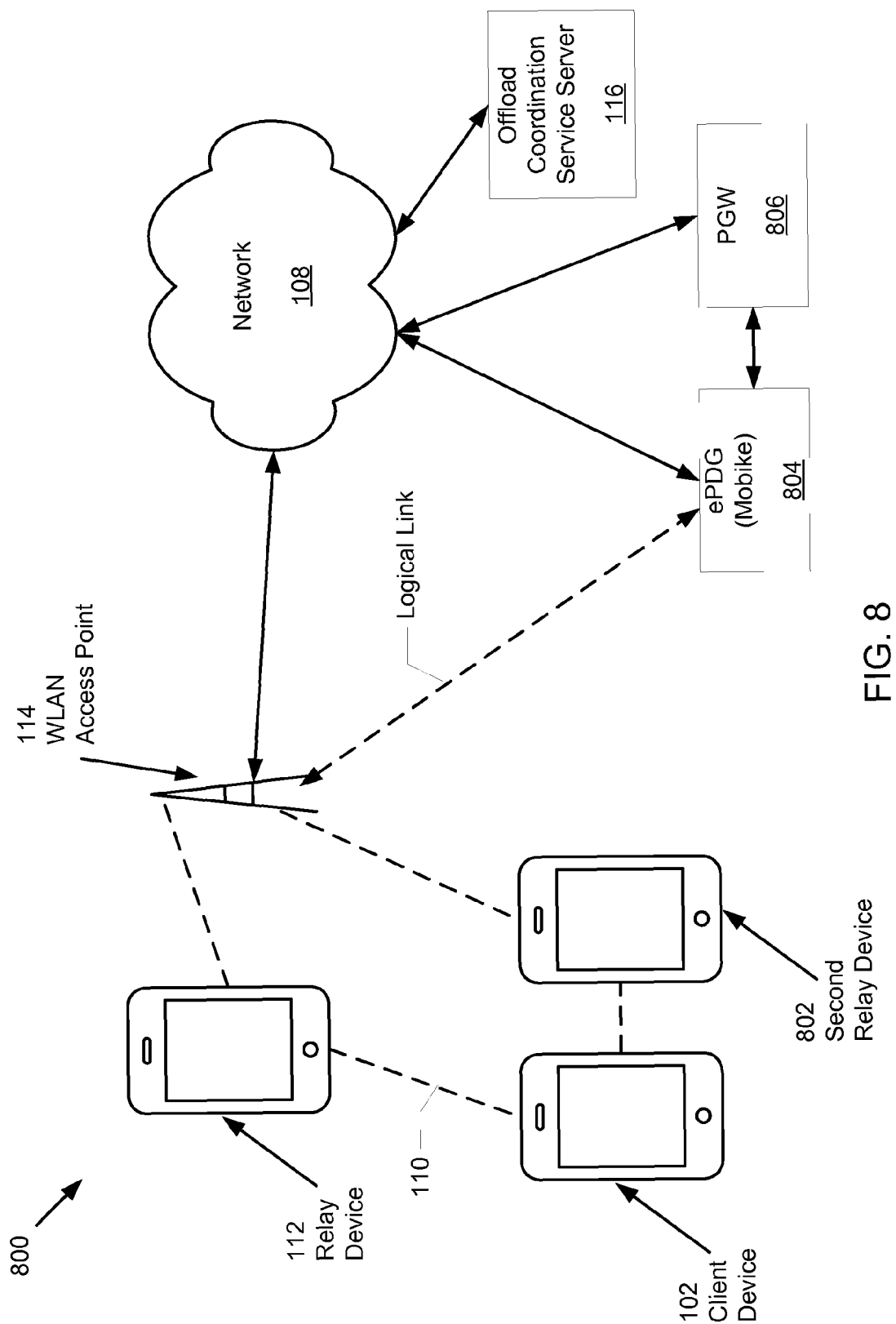
FIG. 8 illustrates an example system for facilitating handover of a wireless communication device between a wireless P2P connection with a first relay device and a wireless P2P connection with a second relay device in accordance with some example embodiments.

FIG. 8 illustrates an example system for facilitating handover between a first wireless P2P connection (e.g., wireless P2P connection 110) with a first relay device (e.g., relay device 112) and a second wireless P2P connection with a second relay device (e.g., second relay device 802) in accordance with some example embodiments. The ePDG 804 and/or PGW 806 can be used to serve as mobility anchors and to ensure that a common network address, such as an Internet protocol (IP) address, is assigned to the client device 102 when the client device 102 moves from the first wireless P2P connection 110 with the first relay device 112 to a second wireless P2P connection with the second relay device 802. In some embodiments, Mobike can be used to facilitate L3 mobility. In some embodiments, the ePDG 804 can be used as a mobility anchor for a handover between two different Wi-Fi connections, while the PGW 806 can be used as a mobility anchor for a handover between a Wi-Fi connection and a cellular connection.

Figure 9:
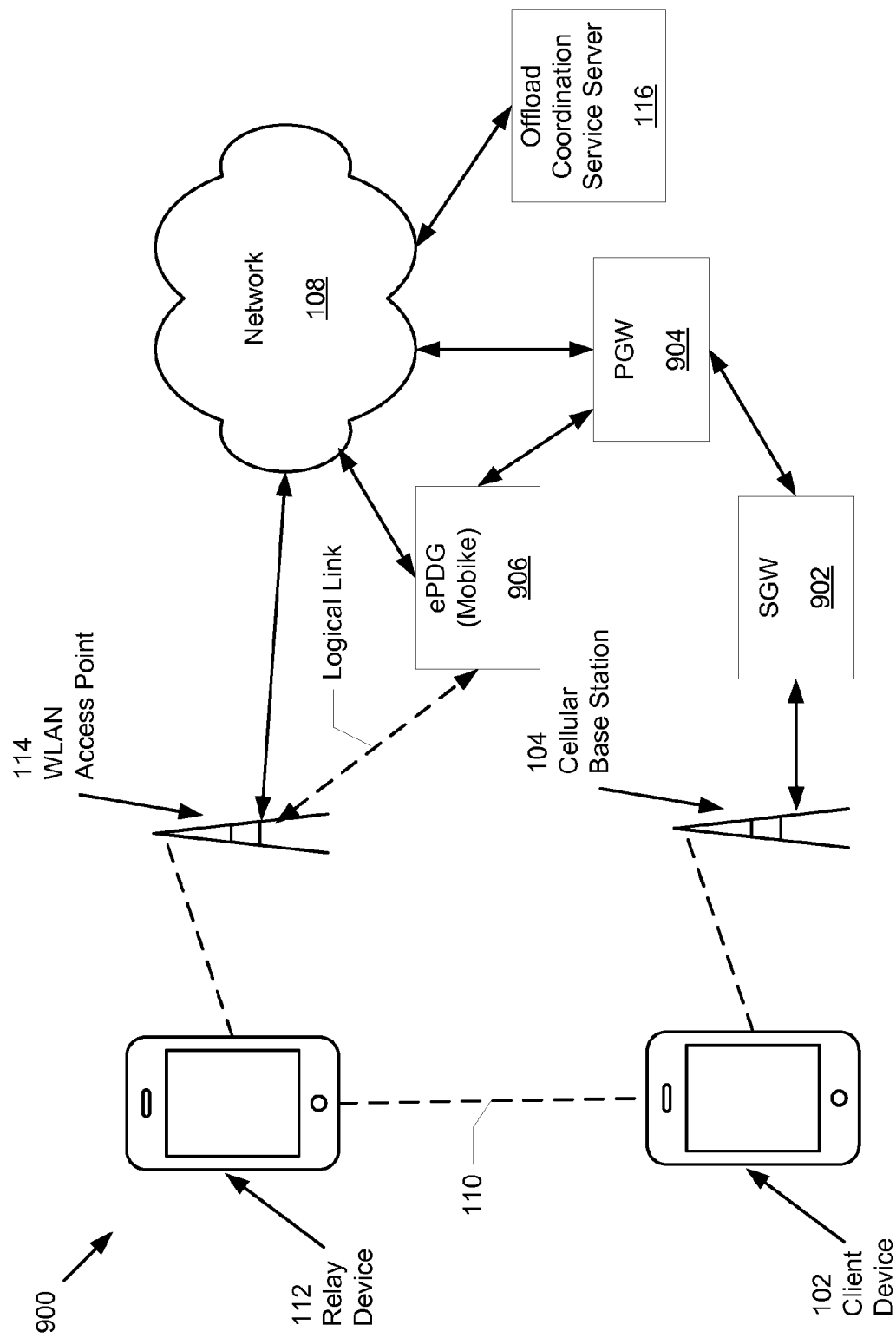
FIG. 9 illustrates an example system for facilitating handover of a wireless communication device between a wireless P2P connection with a relay device and a cellular connection in accordance with some example embodiments.

FIG. 9 illustrates an example system for facilitating handover between a wireless P2P connection (e.g., wireless P2P connection 110) with a relay device (e.g., relay device 112) and a cellular connection (e.g., a connection via cellular base station 104) in accordance with some example embodiments. The PGW 904 and/or PGW 906 can be used to serve as a mobility anchor and to ensure that a common network address, such as an Internet protocol (IP) address, is assigned to the client device 102 when the client device 102 moves from the cellular network connection to the wireless P2P connection 110, and vice versa. In some embodiments, Mobike can be used to facilitate L3 mobility. In some embodiments, the ePDG 904 can be used as a mobility anchor for a handover between two different Wi-Fi connections, while the PGW 906 can be used as a mobility anchor for a handover between a Wi-Fi connection and a cellular connection. A handover between a Wi-Fi connection and a cellular connection, in some embodiments, can be performed in a manner similar to a handover between Wi-Fi and cellular networks as described for interworking WLAN (iWLAN) using S2b interfaces defined in various 3GPP specifications, e.g., TS 23.402. When a device seeks to handover from a Wi-Fi connection to a cellular connection, e.g., to an LTE connection, the device can perform a handover "attach" to a cellular network using a cellular radio connection. When a device seeks to handover from a cellular connection to a Wi-Fi connection, the device can establish an Internet Key Exchange Version 2 (IKEv2) tunnel with the ePDG 904 and can indicate to the cellular network using IKEv2 signaling that the IKEv2 tunnel is intended for a handover "attach."

The various aspects, embodiments, implementations or features of the described embodiments can be used separately or in any combination. Various aspects of the described embodiments can be implemented by software, hardware or a combination of hardware and software. The described embodiments can also be embodied as computer readable code on non-transitory a computer readable medium. The non-transitory computer readable medium is any data storage device that can store data, which can thereafter be read by a computer system. Examples of the computer readable medium include read-only memory, random-access memory, CD-ROMs, HDDs, DVDs, magnetic tape, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to offload data traffic from a cellular connection to a wireless local area network (WLAN) connection, the method comprising a wireless communication device:

accessing, from an offload coordination service server, offloading coordination information for at least one neighboring device that is within sufficient proximity of the wireless communication device to establish a wireless peer-to-peer (P2P) connection and that has access to a WLAN access point;

using the offloading coordination information to select a relay device from the at least one neighboring device;

establishing the wireless P2P connection with the relay device; and offloading data traffic from the cellular connection to the wireless P2P connection so that the data traffic is relayed by the relay device to a network via the WLAN access point that is accessible to the relay device, wherein the offloading coordination information includes capabilities information for the at least one neighboring device including remaining battery capability for the at least one neighboring device, and wherein the wireless communication device selects the relay device based at least in part on the capabilities information satisfying a minimum threshold capability set.

2. The method of claim wherein the method further comprises crediting the relay device with an allocation of a comparable or proportional amount of data that the relay device can offload through other wireless communication devices, or a service to which the relay device subscribes.

3. The method of claim 1, wherein the offloading coordination information includes a list of candidate relay devices.

4. The method of claim 1, further comprising the wireless communication device:
registering the wireless communication device and/or a user thereof with the offload coordination service server;
providing capabilities information of the wireless communication device to the offload coordination service server; and
providing a security credential of the wireless communication device to the offload coordination service server.

5. The method of claim 1, wherein the offloading coordination information includes a set of security credentials for the at least one neighboring device, and further comprising the wireless communication device establishing the wireless P2P connection with the relay device by sending a query that includes a security credential for the relay device from the set of security credentials accessed from the offload coordination service server to the relay device.

6. The method of claim 1, wherein the WLAN access point is not directly accessible to the wireless communication device to provide a WLAN connection to the network.

7. The method of claim 1, further comprising the wireless communication device:
attempting to access the WLAN access point; and
in response to determining that the wireless communication device is unable to access the WLAN access point, accessing the offload coordination service server to locate a relay device through which to connect to the WLAN access point.

8. The method of claim 1, wherein the offloading coordination information includes an indication of a particular neighboring wireless communication device as a preferred choice by the offload coordination service server, and wherein the wireless communication device uses the offloading coordination information to select the particular neighboring wireless communication device as the relay device.

9. A wireless communication device comprising processing circuitry configured to cause the wireless communication device, while connected by a cellular connection to a network, to at least:
determine whether the wireless communication device can access a wireless local area network (WLAN) access point;
when the wireless communication device can access the WLAN access point, establish a WLAN connection with the WLAN access point and offload data traffic from the cellular connection to the WLAN connection; and
when the wireless communication device cannot access the WLAN access point:
discover one or more neighboring wireless communication devices that are able to support a wireless peer-to-peer (P2P) connection for offloading the data traffic;
determine whether the wireless communication device has a security credential to establish the wireless P2P connection with a neighboring wireless communication device;
when the wireless communication device has the security credential, or when a security credential is not required, establish the wireless P2P connection with the neighboring wireless communication device as a relay device to relay the data traffic to and from the network, and offload the data traffic from the cellular connection to the wireless P2P connection, and
when the wireless communication device does not have the security credential, use offloading coordination information, acquired from an offload coordination service server, to select a relay device, establish a wireless P2P connection with the selected relay device, and offload data traffic via the relay device,
wherein offloading coordination information includes one or more security credentials for the one or more neighboring wireless communication devices and remaining battery capability for the one or more neighboring wireless communication devices; and
when the data traffic is offloaded via the relay device, credit the relay device with an allocation proportional or equal to the offloaded data traffic that the relay device can offload through other wireless communication devices, or a carrier-based service to which the relay device subscribes.

10. The wireless communication device of claim 9, wherein the wireless communication device locates the neighboring wireless communication device able to support the wireless P2P connection for offloading the data traffic by:
accessing from the offload coordination service server the offloading coordination information; and
using the offloading coordination information to select the neighboring wireless communication device as the relay device,
wherein the offloading coordination information includes a neighbor list of neighboring devices for the wireless communication device.

11. The wireless communication device of claim 9, wherein the offloading coordination information includes capabilities information for a set of neighboring wireless communication devices for the wireless communication device; and wherein the wireless communication device selects the neighboring wireless communication device as the relay device based at least in part on the capabilities information.

12. The wireless communication device of claim 9, wherein the wireless communication device locates the neighboring wireless communication device by selecting from a list of candidate relay devices provided by the offload coordination service server.

13. The wireless communication device of claim 9, wherein the processing circuitry is further configured to cause the wireless communication device to at least:
register the wireless communication device and/or a user thereof with the offload coordination service server;
provide capabilities information of the wireless communication device to the offload coordination service server; and
provide the security credential of the wireless communication device to the offload coordination service server.

14. The wireless communication device of claim 13, wherein the processing circuitry is further configured to cause the wireless communication device to at least:
provide updates of the capabilities information of the wireless communication device to the offload coordination service server based on one or more of: a change in location of the wireless communication device, detecting a new neighboring wireless communication device, or detecting absence of a previously detected neighboring wireless communication device.

15. The wireless communication device of claim 9, wherein the offloading coordination information includes a security credential for the neighboring wireless communication device, and wherein the wireless communication device establishes the wireless P2P connection to the neighboring wireless communication device using the security credential.

16. The wireless communication device of claim 9, wherein the wireless communication device locates the neighboring wireless communication device at least in part by receiving an indication of a particular neighboring wireless communication device as a preferred choice for offloading from the offload coordination service server.

17. A non-transitory computer readable storage medium having computer program code stored thereon, the computer program code, when executed by one or more processors implemented on a wireless communication device, causing the wireless communication device to perform a method comprising:
registering the wireless communication device and/or a user thereof with an offload coordination service server;
providing capabilities information of the wireless communication device to the offload coordination service server;
accessing, from the offload coordination service server, offloading coordination information for one or more neighboring devices;
using the offloading coordination information to select a neighboring device from the one or more neighboring devices and to establish a wireless peer-to-peer (P2P) connection with the neighboring device to act as a relay device; and
offloading at least a portion of data traffic of a cellular connection between the wireless communication device and a network to the wireless P2P connection to relay to the network via the neighboring device,
wherein the offloading coordination information includes capabilities information for at least one neighboring device including remaining battery capability for the at least one neighboring device, and wherein the wireless communication device selects the relay device based at least in part on the capabilities information satisfying a minimum threshold capability set.

18. The method of claim 1, wherein the capabilities information comprises one or more WLAN technologies that support the wireless communication device, including an estimated data rate available to the wireless communication device, and a quality of service (QoS) offered by the at least one neighboring device to the wireless communication device.

19. The method of claim 1, further comprising utilizing a mobility and multi-homing protocol to facilitate a layer 3 mobility solution to ensure that a common network address is assigned to the wireless communication device when the wireless communication device moves from the cellular connection to the WLAN connection via the P2P connection.

20. The wireless communication device of claim 9, wherein the relay device is able to access the WLAN access point that is not accessible directly by the wireless communication device.

* * * * *

UNITED STATES PATENT AND TRADEMARK OFFICE
CERTIFICATE OF CORRECTION

PATENT NO. : 9,585,078 B2
APPLICATION NO. : 14/158237
DATED : February 28, 2017
INVENTOR(S) : Singh et al.

It is certified that error appears in the above-identified patent and that said Letters Patent is hereby corrected as shown below:

In the Claims

In Claim 2, Column 21, Line 22: "The method of claim wherein" should read -- The method of claim 1, wherein --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*